(12) United States Patent
Kato et al.

(10) Patent No.: US 11,641,459 B2
(45) Date of Patent: May 2, 2023

(54) VIEWING SYSTEM, DISTRIBUTION APPARATUS, VIEWING APPARATUS, AND RECORDING MEDIUM

(71) Applicant: VARK Inc., Tokyo (JP)

(72) Inventors: Takuya Kato, Chiba (JP); Norinaga Ishikawa, Tokyo (JP); Takashi Ookaki, Tokyo (JP)

(73) Assignee: VARK Inc., Tokyo (JP)

( * ) Notice: Subject to any disclaimer, the term of this patent is extended or adjusted under 35 U.S.C. 154(b) by 0 days.

(21) Appl. No.: 17/532,779

(22) Filed: Nov. 22, 2021

(65) Prior Publication Data

US 2022/0360763 A1    Nov. 10, 2022

(30) Foreign Application Priority Data

May 10, 2021    (JP) .............................. JP2021-079862

(51) Int. Cl.
   *H04N 13/349*    (2018.01)
   *H04N 13/361*    (2018.01)
   *H04N 13/366*    (2018.01)

(52) U.S. Cl.
   CPC ......... *H04N 13/349* (2018.05); *H04N 13/361* (2018.05); *H04N 13/366* (2018.05)

(58) Field of Classification Search
   CPC ... H04N 13/349; H04N 13/361; H04N 13/366
   USPC ....................................................... 348/51
   See application file for complete search history.

(56) References Cited

U.S. PATENT DOCUMENTS

| 11,100,695 | B1* | 8/2021 | O'Hagan | ............... G06T 13/40 |
| 2020/0335120 | A1* | 10/2020 | Candelore | .............. H04N 5/247 |

FOREIGN PATENT DOCUMENTS

| JP | 2019-198058 A | 11/2019 |
| JP | 2020-17244 A | 1/2020 |
| JP | 6688378 B1 | 4/2020 |
| JP | 2020-166821 A | 10/2020 |

\* cited by examiner

*Primary Examiner* — Tung T Vo
(74) *Attorney, Agent, or Firm* — WHDA, LLP

(57) ABSTRACT

A viewing system provides a viewing user with an experience of viewing a content that presents a character whose behaviors are controlled based on physical motions of a performer, the content being a binocular stereopsis content that presents staging in a 3D space in which a first character associated with a first performer and a second character associated with a second performer are arranged. The first character is arranged in a first region in the space, a viewpoint associated with the viewing user and the second character are arranged in a second region in the space. The system controls behaviors of the first character based on first motion information of the first performer, and controls behaviors of the second character based on at least one of second motion information of the second performer and information of an operational input performed by the viewing user.

13 Claims, 5 Drawing Sheets

VIEWING SYSTEM, DISTRIBUTION APPARATUS, VIEWING APPARATUS, AND RECORDING MEDIUM

CROSS-REFERENCE TO RELATED APPLICATION(S)

This application claims priority to and the benefit of Japanese Patent Application No. 2021-079862 filed on May 10, 2021, the entire disclosure of which is incorporated herein by reference.

BACKGROUND OF THE INVENTION

Field of the Invention

The present invention relates to a viewing system, a distribution apparatus, a viewing apparatus, and a recording medium, and particularly to a technique to distribute binocular stereopsis contents.

Description of the Related Art

Devices that enable binocular stereopsis, such as a television receiver and a head-mounted display (HMD), are commonly distributed, and it has become such that it is possible for users to easily view binocular stereopsis contents (hereinafter referred to as 3D contents) with use of such devices.

One of 3D contents that can be viewed on such devices is a virtual reality live performance (hereinafter referred to as a VR live performance) in which characters that are coordinated with the behaviors of performers (hereinafter referred to as performer characters) are arranged on a stage in a space that resembles a venue, such as a music hall and a live performance club, and which provides an experience of viewing a performance presented via these performer characters, such as singing and dancing, from a specific position on a floor of the same space. Japanese Patent No. 6688378 discloses a content distribution system that provides a VR live performance that can be viewed simultaneously by a plurality of viewing users.

Incidentally, in a VR live performance, it is preferable that communication and interactions between viewing users and performer characters be possible in order to improve excitement. Meanwhile, in a mode for providing a VR live performance in which a plurality of viewing users simultaneously view a performance of performer characters, it is difficult to realize one-to-one interactions between a viewing user and a performer character. In view of this, the content distribution system disclosed in Japanese Patent No. 6688378 has a function that realizes one-to-many interactions, which enables a feedback of a reaction of a viewing user to a performer by, for example, collecting specific operational inputs that have been made by the viewing user and controlling the behavior of a mob character that is arranged on a floor in association with the viewing user in accordance with the result of collection.

However, such a function is intended to indirectly convey the reaction of the viewing user to the performer, and is limited as interactions between the viewing user and the performer character. For example, according to the mode of the Japanese Patent No. 6688378, the performer understands the reaction of the viewing user via the result of collection or the behavior of the mob character that reflects the result of collection, and interactions between the viewing user and the performer character can be realized by the performer making a response during the performance; however, as the performer character makes the response later than the timing of the reaction of the viewing user, there is a possibility that realistic sensations wane.

SUMMARY OF THE INVENTION

The present invention in its first aspect provides a viewing system that provides a viewing user with an experience of viewing a content that presents a performer character whose behaviors are controlled based on physical motions of a performer, the content being a binocular stereopsis content that presents staging in a three-dimensional space in which a first performer character associated with a first performer and a second performer character associated with a second performer are arranged, the viewing system comprising: a first obtainment unit configured to obtained first motion information indicating physical motions of the first performer; a first behavior control unit configured to control behaviors of the first performer character; a second obtainment unit configured to obtain second motion information indicating physical motions of the second performer; a second behavior control unit configured to control behaviors of the second performer character; a third obtainment unit configured to obtain information of an operational input performed by the viewing user; a decision unit configured to, with respect to the content, decide on a viewpoint associated with the viewing user in the three-dimensional space; a rendering unit configured to render a presentation image associated with the content based on information of the viewpoint that has been decided on by the decision unit; and a presentation unit configured to present the presentation image rendered by the rendering unit, wherein the first performer character is arranged in a first region in the three-dimensional space, the viewpoint associated with the viewing user and the second performer character are arranged in a second region in the three-dimensional space, the second region being different from the first region, the first behavior control unit controls behaviors of the first performer character based on the first motion information obtained by the first obtainment unit, and the second behavior control unit controls behaviors of the second performer character based on at least one of the second motion information obtained by the second obtainment unit and the information of the operational input obtained by the third obtainment unit.

The present invention in its second aspect provides a distribution apparatus that distributes the content in the viewing system according to the first aspect, the distribution apparatus comprising: the first obtainment unit; the second obtainment unit; and a transmission unit configured to transmit the first motion information obtained by the first obtainment unit, as well as the second motion information obtained by the second obtainment unit, to a viewing apparatus used by the viewing user.

The present invention in its third aspect provides a viewing apparatus that presents the content to the viewing user in the viewing system according to the first aspect, the viewing apparatus comprising: a reception unit configured to receive the first motion information obtained by the first obtainment unit, as well as the second motion information obtained by the second obtainment unit; the first behavior control unit; the second behavior control unit; the third obtainment unit; the decision unit; the rendering unit; and the presentation unit.

The present invention in its fourth aspect provides a non-transitory computer-readable recording medium that includes a program recorded thereon, the program being for causing a computer to function as each unit of the viewing apparatus according to the third aspect.

DESCRIPTION OF THE EMBODIMENTS

Figure 1:
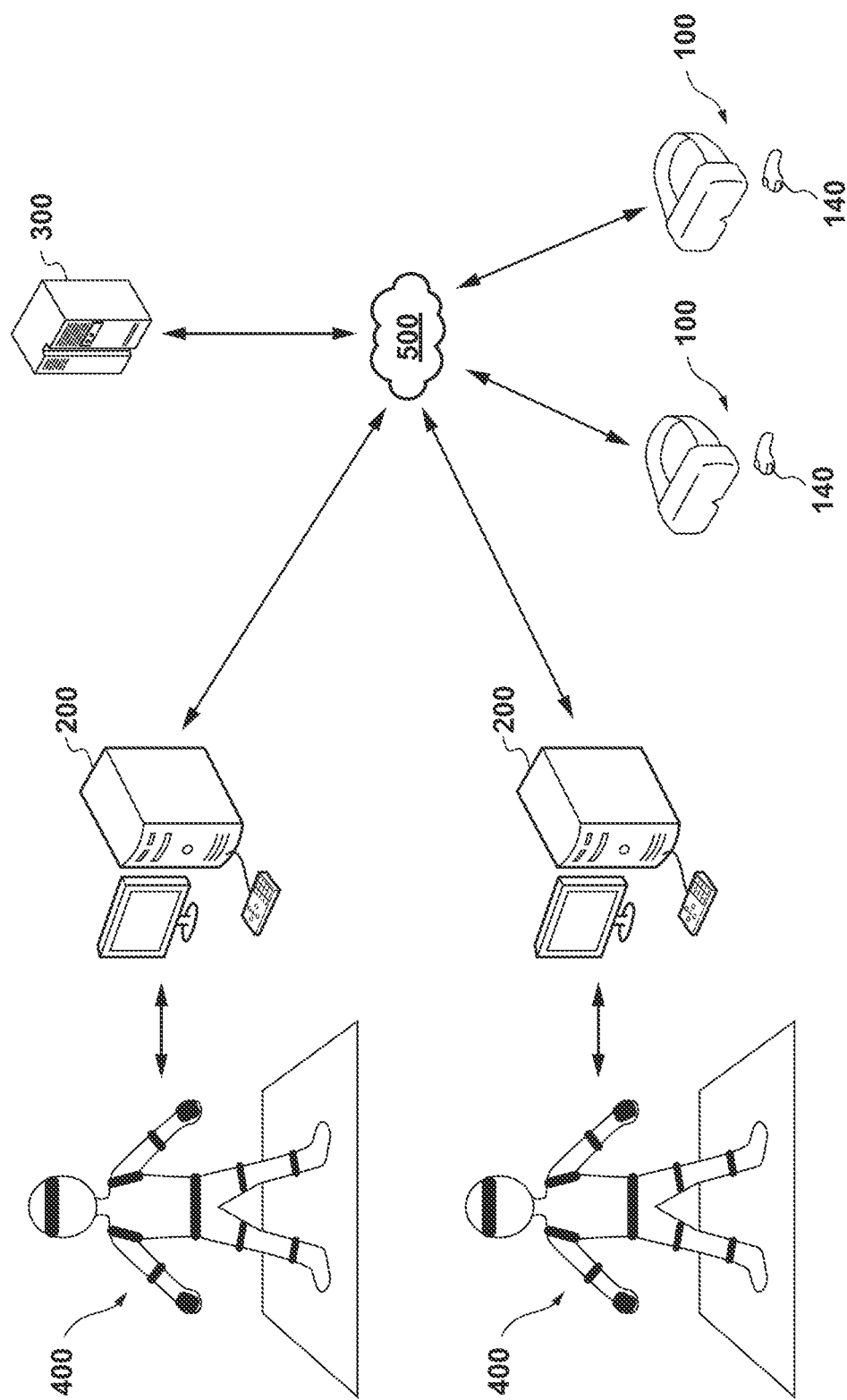
FIG. 1 is a diagram exemplarily showing a configuration of a viewing system according to an embodiment and a modification of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

One embodiment described below pertains to an example in which the present invention is applied to a viewing system that can provide a viewing user with an experience of viewing a binocular stereopsis content that presents two performer characters whose behaviors are controlled based on physical motions of two performers, as one example of a viewing system. However, the present invention can be applied to any group of devices and system that can provide a viewing user with an experience of viewing a content that presents a plurality of performer characters whose behaviors are controlled respectively based on physical motions of a plurality of performers.

Also, the present specification is described assuming that a "performer character" refers to a character to be viewed that appears in a binocular stereopsis content. The following embodiment is described assuming that the behaviors of a performer character are controlled based on a motion of a physical part and a physical motion involving sound production that have been actually made by a performer, who is a human being; however, in carrying out the present invention, a physical motion is not limited to these, and behaviors may be controlled based on a part of these or another action taken by a performer.

«Configuration of Viewing System»

FIG. 1 is a diagram showing a configuration of a system according to an embodiment of the present invention. As shown, a viewing system includes: viewing clients 100 as viewing apparatuses according to the present invention, which are used by viewing users who view a binocular stereopsis content; performer clients 200 that are used on the performing side of performer characters; and a distribution server 300 as a distribution apparatus according to the present invention, which provides a service platform pertaining to content distribution. In the viewing system, the viewing clients 100 and the distribution server 300, as well as the performer clients 200 and the distribution server 300, are connected in a communication-enabled manner via the network 500.

Also, motion capture systems 400 are connected to the performer clients 200, and at least a part of physical motions made by performers can be obtained via the motion capture systems 400. More specifically, the motion capture systems 400 are configured to be capable of measuring physical motions of the performers based on the outputs from a plurality of sensors mounted on the performers, configure motion information indicating these physical motions based on the result of this measurement, and output the motion information to the performer clients 200. During a period in which the distribution server 300 is distributing a content, the performer clients 200 transmit the motion information (motion data) obtained via the motion capture systems 400 to the distribution server 300. Although the present embodiment is described assuming that the motion information output from the motion capture systems 400 is obtained as motion data that is in conformity with a distributed binocular stereopsis content, the performer clients 200 may perform processing for conversion or adjustment into a form that is in conformity with the binocular stereopsis content.

Although the present embodiment is described assuming that a motion capture system 400 is capable of detecting and obtaining physical motions associated with one performer, and assuming that a performer client 200 and a motion capture system 400 are provided for each of the two performers, the present invention is not limited to being carried out in this way. For example, it is possible to adopt a mode in which one motion capture system 400 is capable of detecting physical motions of a plurality of performers, or a mode in which a plurality of motion capture systems 400 that are capable of detecting physical motions associated with one performer are connected to a performer client 200. In this case, one performer client 200 transmits motion information associated with a plurality of performer characters to the distribution server 300.

Note that although the present embodiment is described assuming that the motion capture systems 400 use a method that obtains physical motions of a performer based on the outputs from a plurality of sensors mounted on this performer for the sake of easy understanding of the invention, the present invention is not limited to being carried out in this way. It goes without saying that physical motions made by a performer may be obtained using any method, such as a method that derives three-dimensional positions of a plurality of markers mounted on the performer by way of triangulation based on positions in images captured from a plurality of image capturing apparatuses, a method that derives the same by specifying a physical part by way of image analysis on a captured image that has captured a specific part (e.g., the entire body or the upper body of the performer) and a depth-of-field image, and so forth.

In the present viewing system, the viewing users are provided with, in the form of "live distribution", a binocular stereopsis content intended for viewing of a stage performance made by the performer characters, which includes presentation of the performer characters coordinated with physical motions of the performers, and presentation of speech made by the performers. The live distribution is configured to allow viewing on the plurality of viewing clients 100 connected to the distribution server 300, that is to say, to be capable to realize simultaneous viewing by the plurality of viewing users. Note that although the present embodiment is described assuming that the performers, whose physical motions are obtained by the motion capture systems 400, also input speech made by the performer characters associated with the binocular stereopsis content to be distributed, the actions and speech associated with the performer characters may be made by different performers. It goes without saying that presentation may alternatively be done by using motion data and sound data that have been configured in advance, rather than being done in real time by the performers.

Although the details will be described later, an experience of viewing the binocular stereopsis content provided by the viewing system of the present embodiment is realized by the obtainment of motion information by the performer clients 200 (via the motion capture systems 400) and sound information associated with speech made by the performers, distribution of data necessary for viewing of the binocular stereopsis content including such motion information and sound information from the distribution server 300 to the viewing clients 100, and three-dimensional rendering and sound reproduction on the viewing clients 100 based on distributed information. The present viewing experience is provided via presentation images that have been generated by each viewing client 100 so as to enable each viewing user to view in a desired form (a desired viewing position and viewing direction). While it is possible to generate presentation images in a form corresponding to the orientations of and the operational inputs made by the viewing users in the distribution server 300, it is preferable to reduce a computation load on the distribution server 300 due to the nature of simultaneous viewing of the binocular stereopsis content by the plurality of viewing users. For this reason, in the present embodiment, each viewing client 100 generates presentation images in order to reduce a computation load on the distribution server 300 and allow as many viewing clients 100 as possible to connect to the distribution server 300.

Note that although the present embodiment is described assuming that the performer clients 200 that obtain information associated with the performers, and the viewing clients 100 on which the binocular stereopsis content that includes corresponding performer characters appearing therein is actually viewed, are configured to be capable of exchanging information via the distribution server 300 in view of the form of provision of services, the present invention is not limited to being carried out in this way. For example, the present invention may be realized by connection between the viewing clients 100 and the performer clients 200 without intervention of the distribution server 300, or may be realized by connection between the viewing clients 100 and the performer clients 200 via not only one distribution server 300 but also a plurality of apparatuses.

Although the present embodiment is described assuming that the viewing clients 100 are so-called eyeglass-type devices including a display apparatus (a display unit 120) capable of providing an experience of binocular stereopsis viewing, such as HMDs and the like, the present invention is not limited to being carried out in this way. That is to say, it is sufficient that the viewing clients 100 be devices that are configured to be capable of executing processing associated with reproduction of the content to be distributed and outputting screens and sounds for presentation in order to present an experience of viewing this content, and an apparatus that actually presents these screens and sounds may be a device externally connected to the viewing clients 100.

Note that the network 500 may be, for example, a public communication network (e.g., the Internet), a local area network (LAN), and the like, and it is sufficient for the network 500 to realize information communication among apparatuses. Although network 500 in the present embodiment is described in connection with a mode in which information transmission/reception between the performer clients 200 and the distribution server 300, as well as information transmission/reception between the viewing clients 100 and the distribution server 300, is realized via one network 500, information communication may be performed using different networks 500; for example, the performer clients 200 and the distribution server 300 may be connected via a LAN, and the viewing clients 100 and the distribution server 300 may be connected via a public communication network.

<Configuration of Viewing Clients 100>

Figure 2:
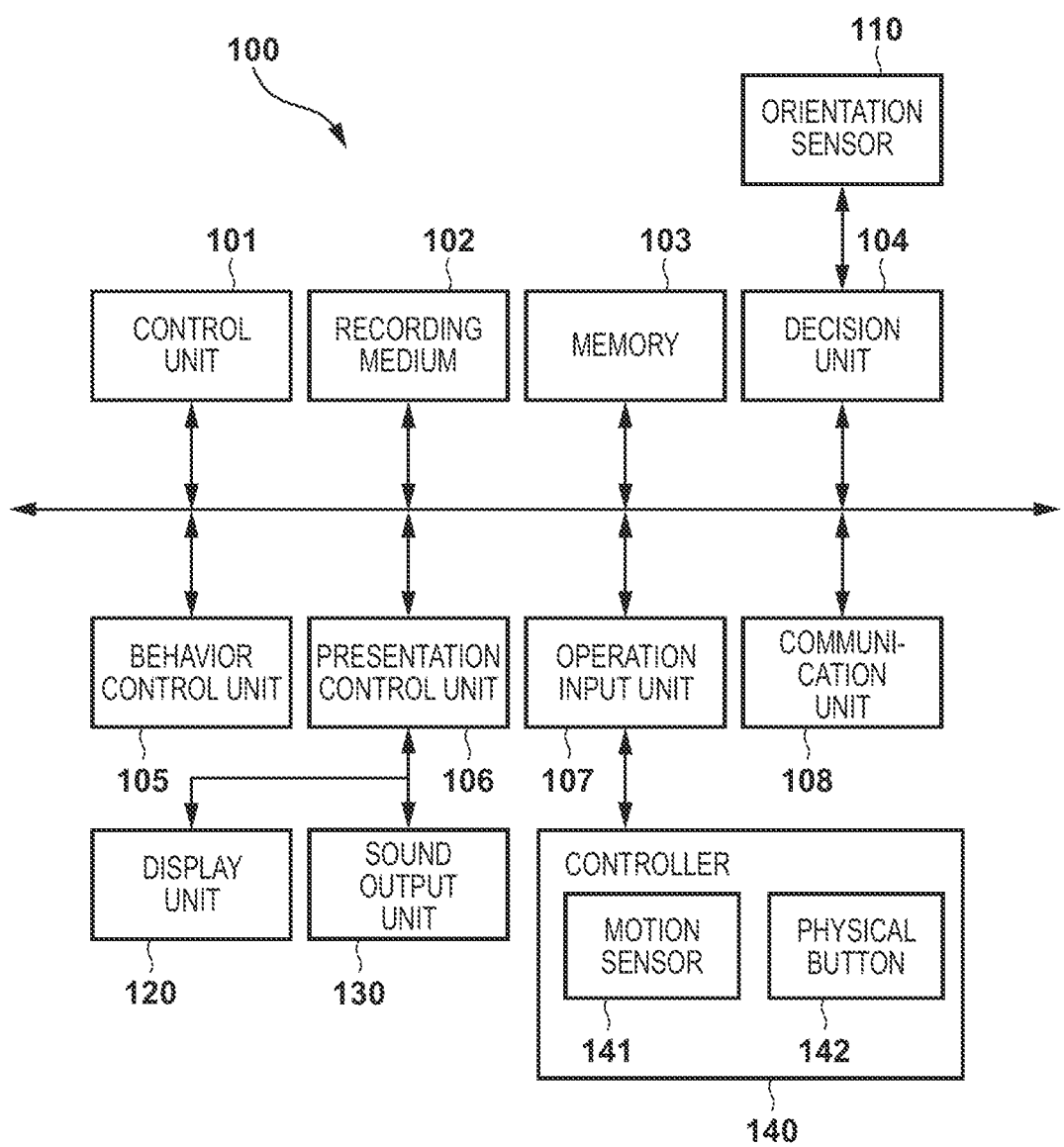
FIG. 2 is a block diagram exemplarily showing the functional constituents of a viewing client 100 according to the embodiment and modification of the present invention.

The following describes the functional constituents of the viewing clients 100 according to the viewing system of the present embodiment with use of a block diagram of FIG. 2.

A control unit 101 is, for example, a CPU, and controls the operations of each block included in the viewing client 100. Specifically, the control unit 101 controls the operations of each block by, for example, reading out an operation program of each block and a program of an application (viewing application) that realizes an experience of viewing the binocular stereopsis content that has been distributed live, which are recorded in the recording medium 102, deploying the programs to a memory 103, and executing the programs.

The recording medium 102 is, for example, a recording apparatus that can permanently hold data, such as a non-volatile memory and an HDD. The recording medium 102 stores not only the operation program of each block included in the viewing client 100 and the program of the viewing application, but also information of parameters and the like that are necessary for the operations of each block. The memory 103 is, for example, a storage apparatus that is used in temporary data storage, such as a volatile memory. The memory 103 is used not only as a region to which the operation program of each block is deployed, but also as a storage region that temporarily stores data and the like output in the operations of each block.

A decision unit 104 decides on viewpoint information for rendering a corresponding three-dimensional space in relation to viewing of the binocular stereopsis content that has been distributed live. Although the details will be described later, the binocular stereopsis content that provides a viewing experience in the viewing system of the present embodiment is configured so as to enable viewing of a three-dimensional space in which at least performer characters associated with two performers are provided. More specifically, the following description will be provided assuming that the binocular stereopsis content of the present embodiment provides an experience of viewing a three-dimensional space that resembles a live performance venue from a floor (viewing seat) side, and one of the two performer characters is arranged on a stage and makes a stage performance.

The decision unit 104 decides on two types of viewpoint information for rendering presentation images with respect to each of the left eye and the right eye of a viewing user at the time of viewing of this three-dimensional space. More specifically, the decision unit 104 decides on, for example, viewpoint parameters indicating a viewpoint position (viewing position), which is the center between the eyes, and a line-of-sight direction (viewing direction) based on the orientation of the viewing client 100, an operational input performed by the viewing user, and the like; at the time of rendering of presentation images, viewpoint parameters for the left eye and the right eye are decided on from these viewpoint parameters, and supplied to a later-described presentation control unit 106.

For the sake of easy understanding of the invention, the present embodiment is described assuming that, in viewing the stage performance associated with the performer characters, the viewing user is provided with a viewing experience in such a manner that his/her viewpoint is located at a position corresponding to the frontmost row of the floor (which is an on-floor position near the stage, with no other characters arranged between the stage and the viewpoint). Therefore, the decision unit 104 decides on initial values of the viewpoint parameters assuming that the position corresponding to this frontmost row is a reference position of the viewpoint, and the direction from this reference position toward, for example, the center of the stage is a reference direction. Also, when the head of the viewing user has moved, or when an operational input associated with a movement of the viewpoint has been performed, the decision unit 104 changes the viewpoint parameters in accordance with the different position and orientation that reflect the movement based on these reference position and reference direction. Here, the movement of the head of the viewing user may be, for example, detected by an orientation sensor 110 mounted on the HMD, such as an acceleration sensor and a gyroscope, and reflected in viewpoint control based on a sensor output from this orientation sensor 110. Note that the method of detecting the movement of the head of the viewing user is not limited to this, and other detection methods, such as a detection method based on analysis on images obtained by shooting the HMD including markers from outside, may be used.

A behavior control unit 105 controls the behaviors of characters that are arranged in the three-dimensional space in association with the binocular stereopsis content. In the present embodiment, the behavior control unit 105 receives motion information (motion data) associated with the performer characters from the distribution server 300, and controls the behaviors of three-dimensional models of the corresponding performer characters based on this motion information. Note that the characters targeted for behavior control performed by the behavior control unit 105 are not limited to the performer characters, and may include, for example, mob characters, such as other spectators located on the floor, and an arbitrary object associated with the viewing user, such as a character that resembles the entire body of the viewing user, and a hand-shaped object that resembles the hands of the viewing user.

The presentation control unit 106 includes, for example, a rendering apparatus, such as a GPU and a graphics chip, and generates a presentation screen to be displayed on a display unit 120. Specifically, the presentation control unit 106 generates an image group associated with each frame by arranging the performer characters in a state where their behaviors have been reflected by the behavior control unit 105, as well as background objects, in the three-dimensional space associated with the live performance venue, and rendering this three-dimensional space with respect to each of the viewpoints for the left eye and the right eye that have been decided on by the decision unit 104. For example, the display unit 120 may be a display apparatus, such as an LCD, and it is assumed that the display unit 120 is arranged in front of the eyes of the viewing user in the form of the HMD.

For example, in a mode which displays images for the left eye and the right eye by dividing a display region of the display unit 120, and which realizes binocular stereopsis by way of viewing of such images via a predetermined optical system, the presentation control unit 106 generates a final presentation screen by arranging a group of images for binocular stereopsis that have been generated with respect to one frame in the left and right directions and combining these images. The presentation control unit 106 realizes the presentation of the binocular stereopsis content by sequentially displaying, on the display unit 120, the presentation images associated with the pertinent frame generated in the foregoing manner.

Also, the presentation control unit 106 includes, for example, a circuit that outputs/amplifies sound signals, such as a soundboard and an amplifier, and performs predetermined processing in generating a sound to be output from a sound output unit 130. Specifically, for example, the presentation control unit 106 converts (D/A conversion) sound data that has been recorded in the recording medium 102 in advance and sound information received from the distribution server 300 into electrical sound signals, outputs the sound signals to the sound output unit 130, and causes sound waves based on these sound signals to be output. For example, the sound output unit 130 may be a sound output apparatus, such as earphones and headphones.

An operation input unit 107 is, for example, an interface included in the viewing client 100, such as a power button and a menu button. Upon detecting that an operational input has been performed with respect to an operation member, the operation input unit 107 outputs a control signal corresponding to this operational input to the control unit 101. Also, in the present embodiment, the operation input unit 107 includes a wirelessly-connected controller 140, and detects not only an operational input that has been performed with respect to a physical button 142, which is a physical operation member included in this controller 140, but also an operational input that has been performed by moving this controller 140 itself. Here, it is assumed that an operational input performed by moving the controller 140 itself is, for example, detected by a motion sensor 141, which may be a gyroscope and the like, and transmitted to the operation input unit 107.

A communication unit 108 included in the viewing client 100 is a communication interface for an external apparatus. The communication unit 108 can enable exchange of data by connecting to the external apparatus via the network 500 (either wireless or wired). For example, the communication unit 108 converts information that has been input as a transmission target into data of a predetermined format, and transmits the data to the external apparatus, such as the distribution server 300, via the network 500. Also, for example, upon receiving information from the external apparatus via the network 500, the communication unit 108 decodes this information and stores the information into the memory 103.

<Configuration of Performer Clients 200>

Figure 3:
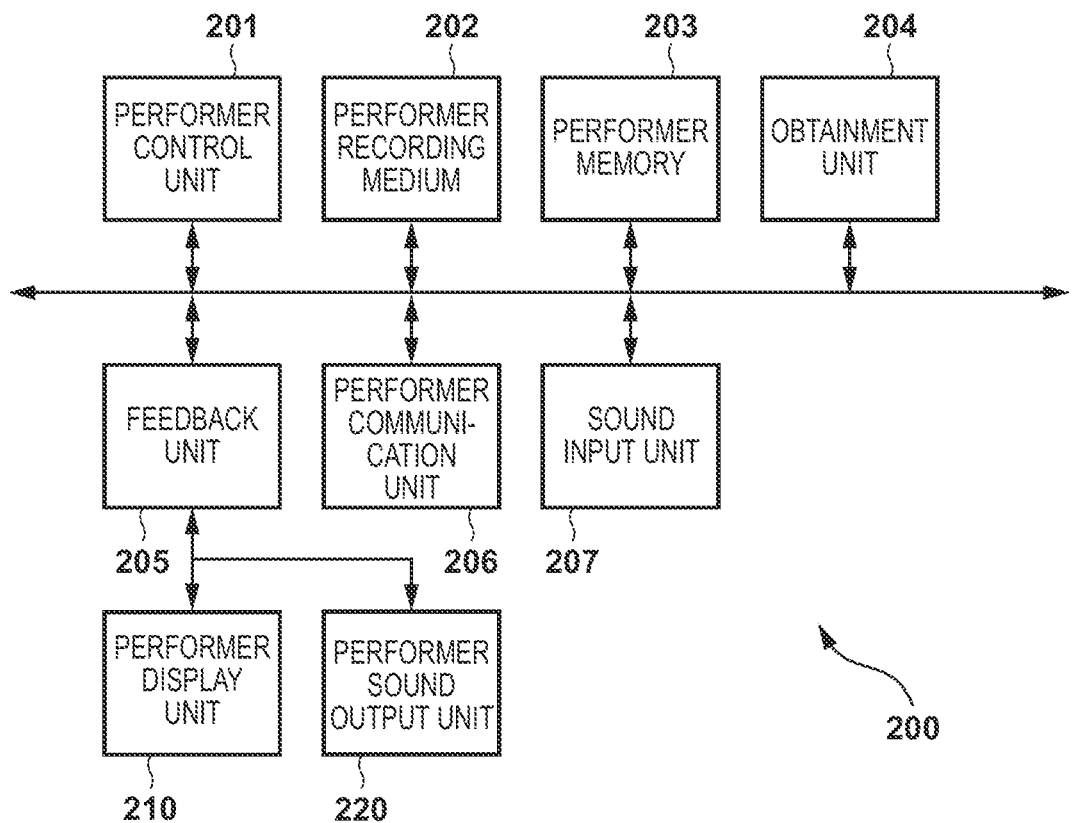
FIG. 3 is a block diagram exemplarily showing the functional constituents of a performer client 200 according to the embodiment and modification of the present invention.

Next, a description is given of the functional constituents of the performer clients 200 according to the viewing system of the present embodiment with use of a block diagram of FIG. 3. Note that in the description of the functional constituents of the performer clients 200, the constituents that realize the functions similar to the constituents of the viewing clients 100 are denoted with the prefix characters "performer", in order to make a distinction from the constituents of the viewing clients 100. Here, "performer" provided as the prefix characters simply indicates one constituent of the performer clients 200, and is not used for the purpose of limiting the functions of described blocks.

A performer control unit 201 is, for example, a CPU, and controls the operations of each block included in the performer client 200. Specifically, the performer control unit 201 controls the operations of each block by, for example, reading out an operation program of each block and a program of an application (distribution application) that performs live distribution of the binocular stereopsis content, which are recorded in a performer recording medium 202, deploying the programs to a performer memory 203, and executing the programs.

The performer recording medium 202 is, for example, a recording apparatus that can permanently hold data, such as a non-volatile memory and an HDD. The performer recording medium 202 stores not only the operation program of each block included in the performer client 200 and the program of the distribution application, but also information of parameters and the like that are necessary for the operations of each block. A performer memory 203 is, for example, a storage apparatus that is used in temporary data storage, such as a volatile memory. The performer memory 203 is used not only as a region to which the operation program of each block is deployed, but also as a storage region that temporarily stores data and the like output in the operations of each block.

An obtainment unit 204 obtains various types of information that are used in the stage performance of the performer characters in relation to the binocular stereopsis content that is distributed live. In the present embodiment, the obtainment unit 204 obtains motion information (used to control the behaviors of the performer characters) indicating the physical motions made by the performers, which has been obtained by the motion capture system 400, and sound information indicating the sound that the performers made while singing, making a microphone performance, and the like, which has been obtained by a sound input unit 207. Here, the sound input unit 207 is an input interface that obtains the sound made by the performers as sound signals via, for example, microphones mounted on the performers. As stated earlier, for the sake of easy understanding of the invention, the present embodiment is described assuming that the output from the motion capture systems 400 is used as is as motion information (motion data) that is used to control the behaviors of the performer characters; however, the present invention is not limited to being carried out in this way, and motion information to be transmitted to the distribution server 300 may be configured by, for example, adjusting the motions of the lips of the performer characters in accordance with sound information, and applying the facial expressions of the performer characters that have been manually selected by the performers, a distribution operator, and the like, or have been selected in accordance with the result of analysis on the content of speech made by the performers. Note that the facial expressions of the performer characters may be controlled by analyzing images (two-dimensional images and depth-of-field images) obtained by capturing the facial expressions of the performers.

A feedback unit 205 presents, to the performers as a feedback, information (interaction information) indicating the input status related to an interaction that has been made by a viewing user with regard to the binocular stereopsis content during live distribution. In the case of a content in which the elements of excitement are formed including a mutual action (interaction) between the actors (performers) and the spectators (viewing users), as with the stage performance of the present embodiment, it is preferable not only to present the performance of the performers to the viewing users via the performer characters, but also to convey the viewing status of the viewing users to the performers. For example, the interaction information includes information indicating the number of operational inputs associated with a specific action made by the viewing users, such as hands up, high-five, and cheering, whether there has been an operational input equivalent to so-called money throwing, such as gift transmission to the performer characters, and also whether there has been an operational input associated with an addition of specific staging on the stage originating from requests from the viewing users.

On the other hand, in a mode in which a plurality of viewing users simultaneously view the binocular stereopsis content, as with the viewing system of the present embodiment, these operational inputs made by the viewing users could possibly occur in large numbers at the same time; thus, each time such operational inputs are made, a computation load on the performer clients 200 could possibly increase, thereby possibly causing a failure in a stage performance, in a mode that gives a feedback to the performers. Therefore, pieces of information of such operational inputs that have been made with respect to the viewing clients 100 are aggregated in the later-described distribution server 300, and then transmitted to the performer clients 200 as the interaction information.

Based on the interaction information received from the distribution server 300, the feedback unit 205 presents a feedback to the performers in such a manner that the form of the presentation varies depending on the statuses of the performers. For example, the feedback may be presented visually on a performer display unit 210, which may be a display apparatus such as an LCD, via text and a predetermined GUI, may be presented auditorily via a performer sound output unit 220, which is a speaker and the like, and may be presented using a combination of these methods or another presentation method.

A performer communication unit 206 included in the performer client 200 is a communication interface for an external apparatus. The performer communication unit 206 can enable exchange of data by connecting to the external apparatus via the network 500 (either wireless or wired). For example, the performer communication unit 206 converts information that has been input as a transmission target into data of a predetermined format, and transmits the data to the external apparatus, such as the distribution server 300, via the network 500. Also, for example, upon receiving information from the external apparatus via the network 500, the performer communication unit 206 decodes this information and stores the information into the performer memory 203.

<Configuration of Distribution Server 300>

Figure 4:
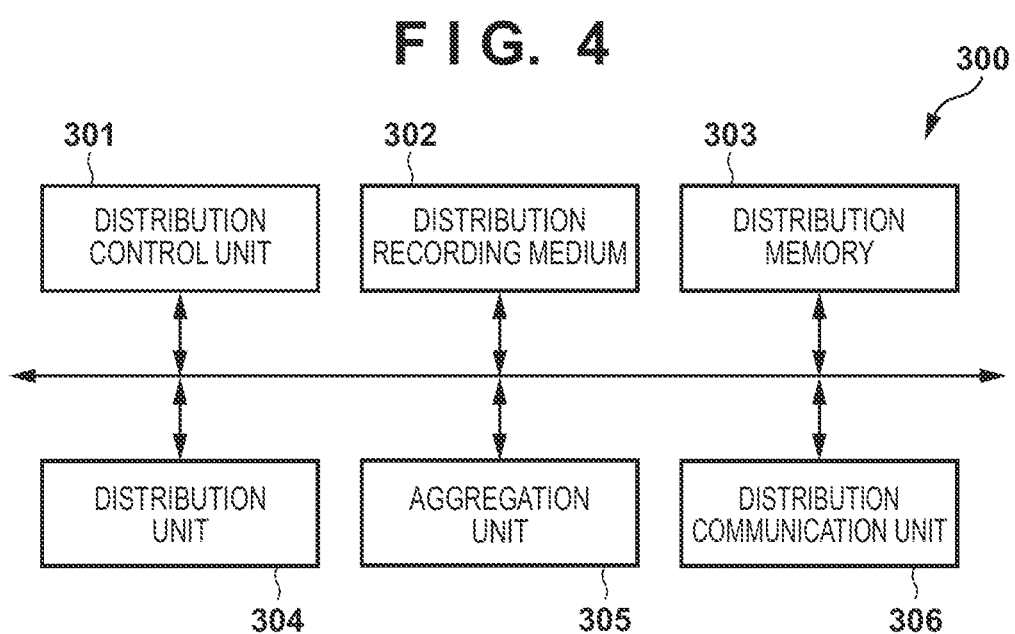
FIG. 4 is a block diagram exemplarily showing the functional constituents of a distribution server 300 according to the embodiment and modification of the present invention.

Next, a description is given of the functional constituents of the distribution server 300 according to the viewing system of the present embodiment with use of a block diagram of FIG. 4. Note that in the description of the functional constituents of the distribution server 300, the constituents that realize the functions similar to the constituents of the viewing clients 100 and the performer clients 200 are denoted with the prefix characters "distribution", in order to make a distinction from the constituents of these devices. Here, "distribution" provided as the prefix characters simply indicates one constituent of the distribution server 300, and is not used for the purpose of limiting the functions of described blocks.

A distribution control unit 301 is, for example, a CPU, and controls the operations of each block included in the distribution server 300. Specifically, the distribution control unit 301 controls the operations of each block by, for example, reading out an operation program of each block recorded in a distribution recording medium 302, deploying the program to a distribution memory 303, and executing the program.

The distribution recording medium 302 is, for example, a recording apparatus that can permanently hold data, such as a non-volatile memory and an HDD. The distribution recording medium 302 stores not only the operation program of each block included in the distribution server 300, but also information of parameters and the like that are necessary for the operations of each block. The distribution memory 303 is, for example, a storage apparatus that is used in temporary data storage, such as a volatile memory. The distribution memory 303 is used not only as a region to which the operation program of each block is deployed, but also as a storage region that temporarily stores data and the like output in the operations of each block.

A distribution unit 304 controls live distribution of the binocular stereopsis content according to the viewing system of the present embodiment. More specifically, with regard to a period of time in which live distribution is performed, the distribution unit 304 performs processing for obtaining motion information and sound information that have been obtained in relation to the performers from the performer clients 200, appropriately configuring information to be transmitted to the viewing clients 100 that have made a viewing request associated with the content and are connected to the distribution server 300, and transmitting the information. Also, with regard to processing that needs to be executed on the viewing clients 100 in connection with viewing of the content, the distribution unit 304 performs control so as to transmit, for example, an instruction for starting that processing at a necessary timing.

Note that for the sake of easy understanding of the invention, the present embodiment is described assuming that the distribution server 300 is configured to perform live distribution of one type of binocular stereopsis content, and only the performer clients 200 used by the performers associated with this content and the viewing clients 100 used by the viewing users who view the same content are connected to the distribution server 300; however, the present invention is not limited to being carried out in this way. For example, the distribution server 300 may simultaneously perform live distribution of a plurality of types of contents; in this case, the distribution unit 304 performs distribution control, for each content, so as to distribute information obtained from corresponding performer clients 200 to viewing clients 100 that have made a request to view the content.

An aggregation unit 305 configures interaction information that is used for a feedback to the performers by aggregating pieces of information obtained from the plurality of viewing clients 100 in relation to the binocular stereopsis content during live distribution. Here, the aggregation of pieces of information performed by the aggregation unit 305 may include, for example, collection of pieces of information of operational inputs that have been made with respect to each viewing client 100 by predetermined time unit, construction of interaction information as information of information of a percentage of users who are making a specific action, or users who have expressed a specific intention, among all viewing users, and so forth.

A distribution communication unit 306 included in the distribution server 300 is a communication interface for external apparatuses. The distribution communication unit 306 can enable exchange of data by connecting to the external apparatuses via the network 500 (either wireless or wired). For example, the distribution communication unit 306 converts information that has been input as a transmission target into data of a predetermined format, and transmits the data to the external apparatuses, such as the viewing clients 100 and the performer clients 200, via the network 500. Also, for example, upon receiving information from the external apparatuses via the network 500, the distribution communication unit 306 decodes this information and stores the information into the distribution memory 303.

«Viewing Experience Provided via Live Distribution»

Next, the experience of viewing the binocular stereopsis content (provided content) provided in the viewing system configured in the foregoing manner will be described in detail using the drawings.

Figure 5:
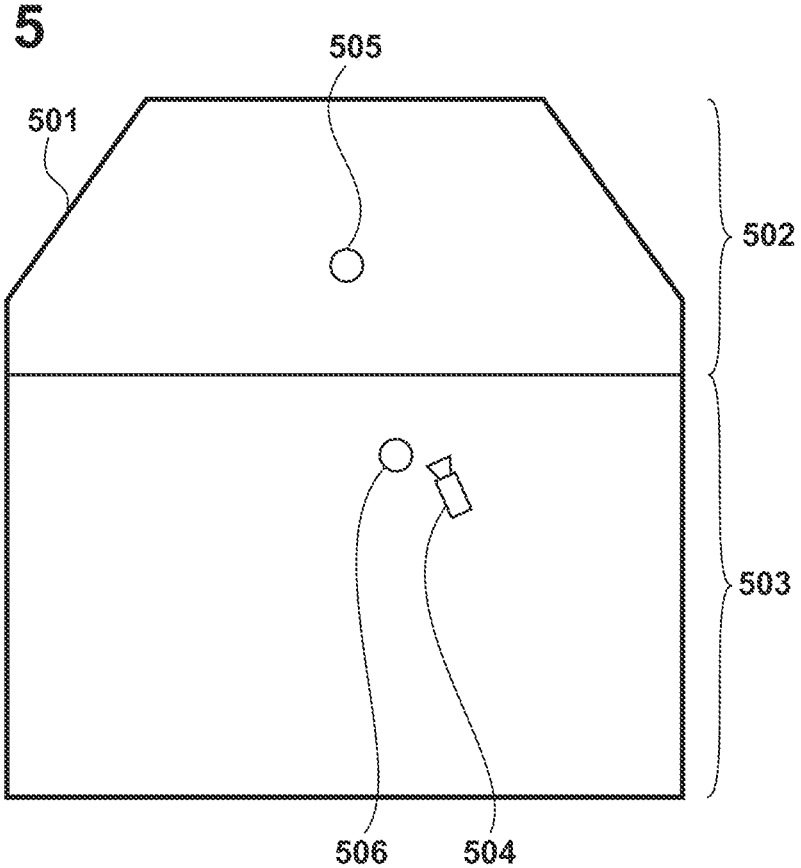
FIG. 5 is a diagram exemplarily showing a three-dimensional space, which is constructed in correspondence with a provided content, according to the embodiment and modification of the present invention.

FIG. 5 shows a schematic configuration of a three-dimensional space of a live performance venue 501 rendered by the binocular stereopsis content according to the present embodiment. As shown in the figure, the inside of the live performance venue 501 is categorized into a stage 502 and a floor 503 that respectively serve as a first region and a second region according to the present invention. While FIG. 5 indicates that they are separated in a two-dimensional region while illustrating the live performance venue 501 as a top view, the stage 502 and the floor 503 may be separated in such a manner that, for example, the positions thereof in the height direction on a ground surface vary.

A viewpoint 504 associated with a viewing user is configured to be arranged on the floor 503, and to be capable of viewing a performance made on the stage 502. Although the present embodiment is described assuming that the viewpoint 504 is not arranged on the stage 502 for the sake of easy understanding of the invention, the present invention does not exclude a configuration in which the viewpoint 504 is movable from the floor 503 to the stage 502.

A performer character (hereinafter referred to as a stage character) associated with one of the two performers is located on the stage 502 as a first performer character according to the present invention. That is to say, a stage performance progresses based on the physical motions of and the sound produced by this performer, and the viewing user can view the stage performance made via the stage character 505 from the floor 503.

In contrast, a performer character associated with the other of the two performers is located on the floor 503, rather than the stage 502, as a second performer character according to the present invention. That is to say, in the provided content according to the present embodiment, this performer character associated with the other performer is located on the floor 503 as a character that views, together with the viewing user, the stage performance made by the stage character 505 on the stage 502. That is to say, the physical motions of and the sound produced by the other performer are not used for the purpose of the progress of the stage performance, but are used to present, to the viewing user, the conducts of another spectator who is viewing the stage performance similarly to the viewing user.

The present embodiment is described in relation to an example in which the performer character associated with the other performer is located adjacent to the viewpoint 504

Figure 6:
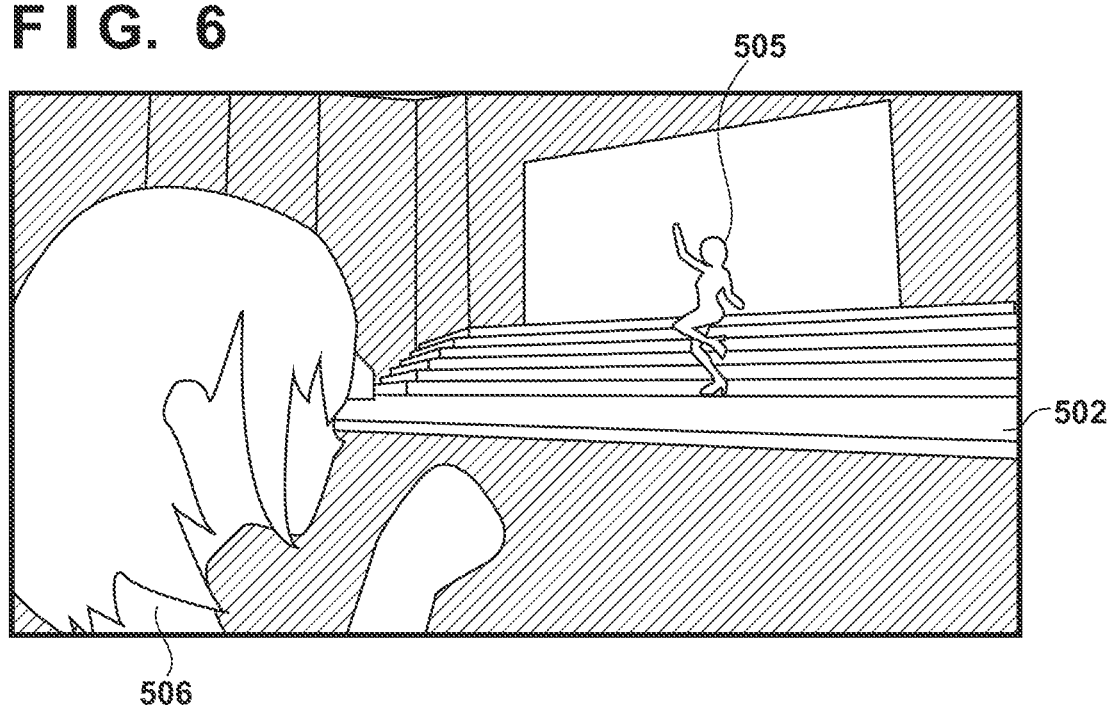
FIG. 6 is a diagram exemplarily showing a presentation image presented on the viewing client 100 according to the embodiment and modification of the present invention.

(positionally located so that no other object exists therebetween), as a mode in which excitement associated with the arrangement of this performer character is especially increased. In this way, the viewing user can be provided with an experience in which he/she is not viewing the stage performance alone, but has come to view the live performance with this performer character (506) as shown in FIG. 6. The performer character located on the floor 503 is an object that is assigned an adjacent seat in the live performance venue (in a broad sense, standing adjacently in the live performance venue); thus, in the following description, this performer character is referred to as a "sequential number character" with use of the expression "sequential number", which means that serial numbers recorded on admission tickets are contiguous. As shown in FIG. 5, the sequential number character 506 is located at a position that is not distanced from the reference position of the viewpoint 504 by more than a predetermined distance.

Note that although mob characters associated with viewing users who are similarly viewing the provided content with use of other viewing clients 100 are located on the floor 503, these mob characters are located as the aspect of joyful elements, and their behaviors are not controlled to successively reflect the physical motions of and the sound produced by specific viewing users. For one viewing user, the importance of knowing the reactions of other viewing users in the service of live distribution in minute detail is not so big, and he/she can attain favorable realistic sensations as long as he/she can roughly grasp the atmosphere of the live performance venue 501. From another standpoint, controlling the behaviors of each mob character in minute detail by obtaining the physical motions and speech of a large number of viewing users increases a computation load and a communication load on the entire viewing system, which is not favorable in providing the service. It is therefore assumed that, in the viewing system of the present embodiment, the behaviors of mob characters are controlled based on information of a collection of viewing statuses collected by the aggregation unit 305 of the distribution server 300. That is to say, it is assumed that the behaviors of mob characters are roughly controlled in accordance with the tendencies of the viewing statuses of all viewing users, and mob characters are located on the floor 503 as the objects that are clearly different from the sequential number character 506.

<Behaviors of Performer Characters>

The following describes, in more detail, the behaviors of the stage character 505 and the sequential number character 506 that are controlled based on the physical motions of the performers in the provided content. Note that for the sake of convenience of explanation, the distinction is made by giving the character "A" to the performer client 200, the motion capture system 400, and their functional constituents associated with the performer A whose physical motions are reflected in the stage character 505, and by giving the character "B" to the performer client 200, the motion capture system 400, and their functional constituents associated with the character B whose physical motions are reflected in the sequential number character 506, as necessary.

Basically, the behaviors of both of the stage character 505 and the sequential number character 506 are controlled based on the physical motions of the performers. More specifically, the behaviors of the stage character 505 are controlled based on motion information a indicating the physical motions of the performer A, which has been obtained by the performer client 200A via the motion capture system 400A. Also, the behaviors of the sequential number character 506 are controlled based on motion information B indicating the physical motions of the performer B, which has been obtained by the performer client 200B via the motion capture system 400B. That is to say, the distribution server 300 obtains the motion information A and the motion information B from the performer client 200A and the performer client 200B, respectively, and distributes them to each of the viewing clients 100 that are currently connected. Then, the behavior control units 105 of respective viewing clients 100 control the behaviors of the stage character 505 and the sequential number character 506 based on the received pieces of motion information A and B; this realizes the provision of the viewing experience of binocular stereopsis with respect to the three-dimensional space in which the stage character 505 reflecting the physical motions of the performer A, as well as the sequential number character 506 reflecting the physical motions of the performer B, is arranged.

Here, in the present embodiment, the stage character 505 and the sequential number character 506 are configured in such a manner that they differ from each other in at least one of the following points.

(1) Whether the Behaviors are Controlled Based on Elements Other than the Physical Motions of the Performer In order to stably provide the stage performance made by the stage character 505, the behaviors of the stage character 505 are controlled based solely on the motion information A. That is to say, for example, if an interaction is set in which a response is mandatorily made to a specific operational input performed by a viewing user, there is a possibility that the stage performance is not provided in a favorable form; thus, the behaviors of the stage character 505 are controlled irrespective of information of an operational input performed by a viewing user.

Note that it is not an object of the provided content of the present embodiment to provide the stage performance made by the stage character 505 unilaterally, and the provided content provides a bidirectional viewing experience that could possibly change, in terms of progress, in accordance with the viewing statuses of viewing users. However, this viewing experience is not realized by directly changing the behaviors of the stage character 505 based on information of an operational input performed by a viewing user, but is realized as the motion information A, which includes a reaction to an operational input, is provided and reflected in the behaviors of the stage character 505 as a result of the performer A making physical motions with reference to interaction information that has been configured in the aggregation unit 305 and presented to the performer A via the feedback unit 205A, as disclosed in Japanese Patent No. 6688378. Therefore, the behaviors of the stage character 505 are controlled consistently based on the physical motions of the performer A, which leads to a mode that provides a stable and fair stage performance.

On the other hand, the sequential number character 506 is not an object that provides a stage performance, but is an object that is located so as to be on the side of a viewing user because the sequential number character 506 views a stage performance; the sequential number character 506 gives natural impressions and a sense of intimacy to the viewing user through such acts as showing a reaction corresponding to the actions of the viewing user. Therefore, the behaviors of the sequential number character 506 are not limited to the motion information B, and are controlled based on at least one of the motion information B and information of an operational input performed by a viewing user. Here, an operational input need not be limited to something that is explicitly performed, such as an operation of depressing the physical button 142, and may include other inputs and detections of states, such as physical motions of a viewing user obtained via the orientation sensor 110 and the motion sensor 141, and sound inputs.

For example, in a period in which the stage character 505 makes a microphone performance between musical numbers during a stage performance, the behaviors of the sequential number character 506 may be controlled based solely on the motion information B so as to enable mutual actions of the stage character 505 and the sequential number character 506. Also, for example, in a period in which a singing performance is made in association with a musical number that does not involve mutual actions of the stage character 505 and the sequential number character 506, the behaviors of the sequential number character 506 may be controlled based solely on information of an operational input performed by a viewing user by giving priority to the information of the operational input over the motion information B. Alternatively, in order to provide an exciting experience with more interactions, while the behaviors of the sequential number character 506 are controlled based on the motion information B, control may be performed so that the behaviors of the sequential number character 506 change successively to the contents based on operational inputs that have been performed by viewing users.

Control on the behaviors of the sequential number character 506 based on information of an operational input performed by a viewing user, that is to say, interaction elements set for the sequential number character 506, may be in the following forms. For example, when a viewing user has performed an operational input involving a talk to the sequential number character 506 (inputting of a sound, selection of a command for talking, and the like), control may be performed so that the sequential number character 506 makes an action indicating such reactions as looking back. Also, for example, when a viewing user has performed an operational input involving a gaze on the sequential number character 506 rather than the stage character 505 (e.g., an action whereby the viewing user turns his/her head so that the viewing direction faces the sequential number character 506, or a camera selection operation for viewing the same direction), control may be performed so that the sequential number character 506 makes an action indicating such reactions as becoming bashful with an awareness of the stare and initiating a conversation. More specifically, when an angle formed by the direction connecting between the viewpoint position and the position of the sequential number character 506 and the viewing direction has become equal to or smaller than a predetermined angle as a result of an operational input for changing the viewing direction of the viewpoint 504, the behavior control unit 105 may control the sequential number character 506 so that corresponding actions are made. Furthermore, for example, control may be performed so that the sequential number character 506 makes such actions as talking to a viewing user when a state with no specific operational input has lasted for a predetermined period. As described above, the behaviors of the sequential number character 506 corresponding to information of an operational input performed by a viewing user are started dynamically, and thus may be realized based on, for example, motion data and sound information that have been configured in advance, rather than being realized with use of data that is obtained in real time, such as the motion information B.

Here, in a mode that provides an experience of viewing a live performance while being adjacent to one performer character (sequential number character 506), as with the provided content of the present embodiment, it is preferable that each of a plurality of viewing users be able to interact with the sequential number character 506 associated with one performer B. In other words, it is preferable that the acts of the sequential number character 506 corresponding to an operational input be caused only by an operational input performed by a viewing user himself/herself, rather than being caused by an operational input of another viewing user. This produces the effect whereby an intimate relationship between the sequential number character 506 and a viewing user is staged, thereby further improving the excitement of the provided content.

Therefore, control on the behaviors associated with an interaction between a viewing user and the sequential number character 506 is configured so that different viewing users view the interaction in different ways. More specifically, although the behavior control unit 105 of the viewing client 100 used by one viewing user controls the behaviors of the sequential number character 506 based on information of an operational input detected by this viewing client 100, it does not control the behaviors of the sequential number character 506 based on information of an operational input detected by another viewing client 100. That is to say, although the distribution server 300 constructs interaction information by obtaining information of operational inputs performed on respective viewing clients 100, it does not perform processing for transmitting the information of the operational input in order to control the behaviors of the sequential number characters 506 associated with other viewing clients 100.

A plurality of states may be defined with regard to the sequential number character 506, and which one of the motion information B and information of an operational input performed by a viewing user serves as the basis for control on the behaviors of the sequential number character 506, may be switchable depending on which one of the states the sequential number character 506 is in. The states may include a performer priority state as a first state according to the present invention, and an interaction priority state as a second state according to the same; the behaviors may be controlled based on the motion information B in the performer priority state, whereas the behaviors may be controlled based on information of an operational input performed by a viewing user or the motion information B. In the latter state, the behaviors are basically controlled based on the motion information B so that the behaviors are perceived as more natural acts; however, when a particular operational input has been performed, data corresponding to this operational input may be prioritized over the motion information B (switchover) as the basis for control on the behaviors. In this case, in order to make a smooth transition between behaviors at the time of switchover, the behaviors may be controlled by performing weighted addition of the motion information B and the corresponding data while changing the weights successively (the weight of the corresponding data is gradually increased at the start, and gradually reduced at the end).

The state of the sequential number character 506 may be controlled in accordance with the progress of the provided content; for example, the performer priority state may be set in a period in which a microphone performance is made during the stage performance as stated earlier, and the interaction priority state may be set in a period in which a singing performance is made. In addition, for example, it is permissible to adopt a configuration in which the state can be changed by the performer B at an arbitrary timing, or a configuration in which the state can be changed in accordance with the states of the performers and the stage performance determined by the distribution server 300.

As described above, the stage character 505 and the sequential number character 506 differ from each other in that the behaviors of the former are controlled based solely on the physical motions of the performer, whereas the behaviors of the latter are controlled based also on the elements other than the physical motions of the performer. That is to say, the stage character 505 acts in order to provide a planned stage performance unless the performer a voluntarily makes physical motions based on a feedback; on the other hand, the sequential number character 506 can present different elements of excitement because it presents dynamic acts corresponding to the viewing mode of a viewing user in addition to acts associated with the physical motions of the performer B.

(2) Whether it has Been Determined that Contact has Been Made

In viewing of a live performance in a real world, basically, there is little opportunity for an on-stage artist and spectators to make contact with each other. On the other hand, one spectator has many opportunities to make contact with an accompanying spectator or a sequential number spectator, and an unnatural impression could possibly be given if an interaction that allows a viewing user to make contact with the sequential number character 506 is not set in the experience of viewing the provided content.

Therefore, in order to improve the realistic sensations of the viewing experience, the provided content of the present embodiment is configured so as to enable a viewing user to perform an operation of moving a hand-shaped object that is arranged in the three-dimensional space in association with this viewing user, as if the hand-shaped object is his/her own hand, by changing the position and orientation of the controller 140, for example. This hand-shaped object is a concept that plays the role of an interface for contact with another object arranged in the three-dimensional space, and the viewing user can make an interaction whereby he/she makes contact with the sequential number character 506 by performing an operation of moving the hand-shaped object.

More specifically, three-dimensional volumes for contact determination are set with respect to the hand-shaped object and the sequential number character 506, and it is determined that contact has been made when they have overlapped each other. That is to say, in the viewing system of the present embodiment, it is possible to detect that an operational input related to contact between the viewing user and the sequential number character 506 has been made by way of contact determination for these objects. Therefore, the aforementioned operational input performed by the viewing user so as to talk to the sequential number character 506 may be detected via, for example, a state where the hand-shaped object has made contact with the sequential number character 506, such as a shoulder-tapping action that involves the hand-shaped object along with a movement of the controller 140. In this case, it is sufficient for the behavior control unit 105 to control the sequential number character 506 so as to show a corresponding behavior or staging when the result of contact determination shows that contact has been made.

On the other hand, as the contact determination is made based on the states of objects on a per-frame basis, it could possibly become an immense load depending on the computation capabilities of the viewing clients 100, and may create problems in the experience of viewing the provided content. It is therefore possible to adopt a configuration in which, with respect to the stage character 505 for which the contact opportunity is difficult to predict, processing related to the determination about contact with the hand-shaped object is not performed.

Thus, the stage character 505 and the sequential number character 506 are different from each other in terms of whether processing related to the determination about contact with the hand-shaped object associated with the viewing user is performed, and there is a difference between the modes of interaction that can be made by the viewing user.

Note that although no specific description is provided in relation to the viewing clients 100 of the present embodiment, in a mode in which the controller 140 includes a constituent that presents a sense of force, such as a vibration motor, a viewing experience with more realistic sensations may be provided by presenting a sense of force, together with the determined contact, when it has been determined that the contact has been made. Also, when the contact has been made, sound staging associated with the contact may be presented. Furthermore, for example, this function can also be used in exciting staging, such as high-five with the sequential number character 506; it may be transmitted to the distribution server 300, shared by the performer client 200A or 200B as interaction information, and presentable to the performers as a degree of enthusiasm in the viewing status.

In addition, although the present embodiment is described assuming that the state of the hand-shaped object is controlled based on an operational input that has been performed with respect to the controller 140 (an operation of moving/rotating the controller 140 itself, or an operational input with respect to the operation member), the present invention is not limited to being carried out in this way. For example, it goes without saying that the hand of the viewing user may be detected by an external camera mounted on the HMD and the like, without using the controller 140, and the state of the hand-shaped object may be controlled in accordance with the actual movement of the hand of the viewing user.

(3) Difference in Mode of Sound Presentation

As described above, while sound staging is presented with use of sound information associated with each performer in the experience of viewing the provided content of the present embodiment, the realistic sensations of the viewing experience can be increased by using different modes for this presentation depending on which character has produced a sound.

In viewing of a live performance in a real world, the form of presentation of a sound produced by an on-stage artist is generally such that the sound is obtained via a microphone, undergoes signal amplification, and then is output from speakers that are arranged in a plurality of positions in a live performance venue. That is to say, as spectators hear the sound of the artist from various directions, although they visually know the position of the artist, it is difficult to auditorily specify the position of the sound source (sound localization). On the other hand, as spectators hear a sound produced by an accompanying spectator or a sequential number spectator directly without intervention of a microphone, sound location can easily be done.

The provided content of the present embodiment uses different modes of presentation of sound staging for respective performer characters by reflecting such differences in auditory perception. More specifically, with regard to sound information associated with the sequential number character 506, the presentation control unit 106 performs control so that the sound output unit 130 performs an output in a mode that enables sound localization based on the viewing position, the viewing direction, and the position of the sequential number character 506. On the other hand, with regard to sound information associated with the stage character 505, the presentation control unit 106 performs control so that the sound output unit 130 performs an output in a mode that does not enable sound localization. Here, the mode that enables sound localization is assumed to denote a mode in which, for example, the output is performed differently between the left-ear side and the right-ear side in terms of the sound volume and effects in accordance with the position of the sound source in a coordinate system that uses the position of the viewpoint 504 as the origin and the depth direction as the viewing direction, and in which a viewing user can estimate the direction of the sound source to some extent based on the balance therebetween. In contrast, the mode that does not enable sound localization is assumed to denote a mode in which the form of the output is such that there is no such differences in the sound volume and effects between the left-ear side and the right-ear side.

The above-described differences between the stage character 505 and the sequential number character 506 have been presented for the purpose of indicating one mode of carrying out the present invention, and the invention is not limited to being carried out based on these. Regarding the differences between the stage character 505 and the sequential number character 506, other differences may exist as long as, in the experience of viewing the provided content, staging of the former is controlled so as to provide similar exciting experiences to all viewing users, whereas the latter is arranged in a region that falls in the same category as the viewpoint of a viewing user in the three-dimensional space, and staging thereof is controlled so as to provide an exciting experience that involves staging corresponding to an operational input performed by the viewing user.

«Presentation Processing»

Figure 7:
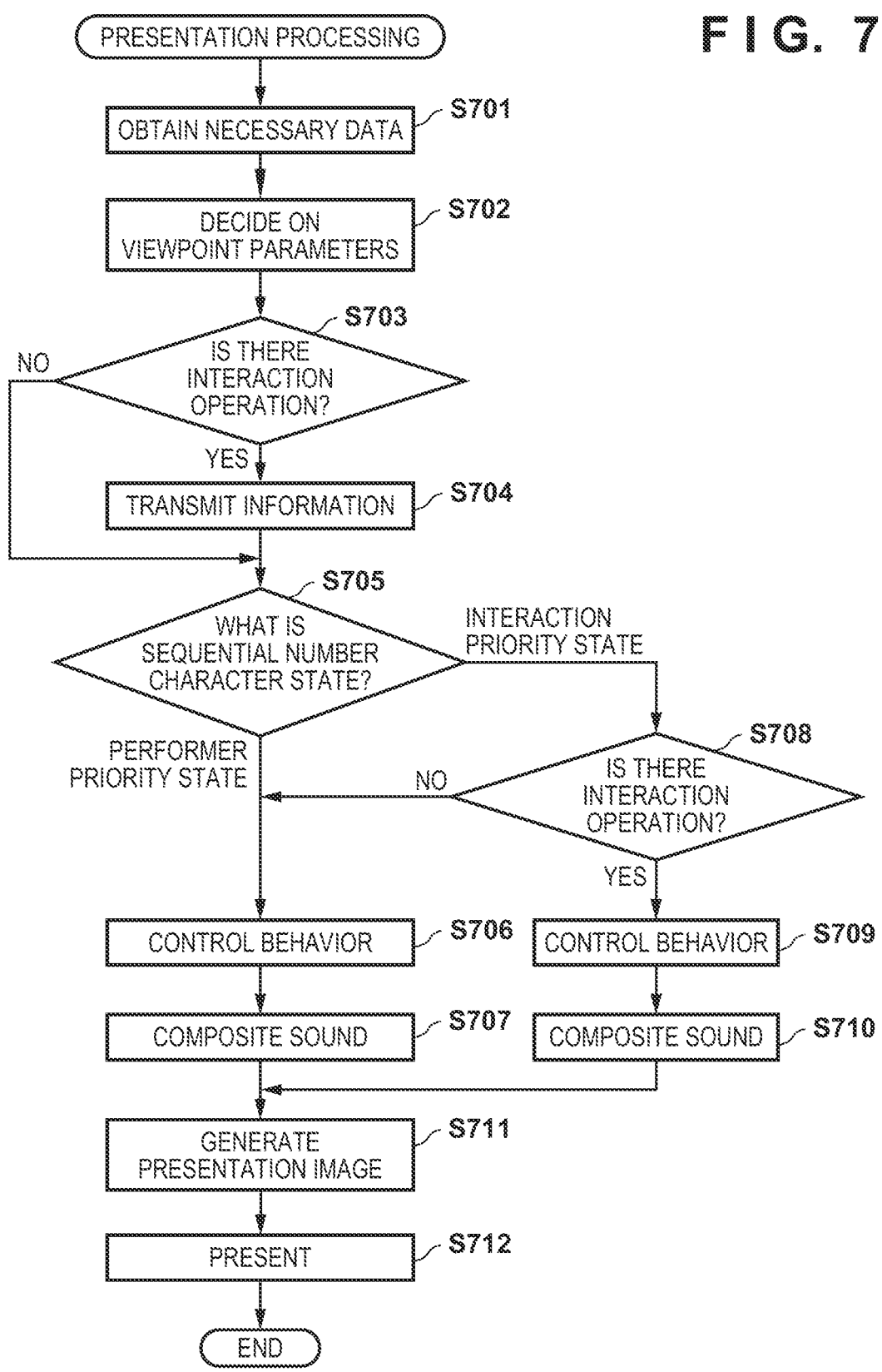
FIG. 7 is a flowchart exemplarily showing presentation processing that is executed in association with the provision of a viewing experience in the viewing system according to the embodiment of the present invention.

With use of a flowchart of FIG. 7, the following describes specific processing related to presentation processing for presenting the experience of viewing the binocular stereopsis content on the viewing client 100 of the present embodiment. Processing corresponding to this flowchart can be realized by, for example, the control unit 101 of the viewing client 100 reading out the program of the corresponding viewing application recorded in the recording medium 102, deploying the program to the memory 103, and executing the program. Note that the present presentation processing is described assuming that the processing is started when, for example, the viewing application has been activated and an operational input associated with the start of viewing of the provided content has been performed, and the processing is executed repeatedly on a per-frame basis in the viewing experience.

In step S701, the control unit 101 obtains data that is necessary for viewing of the provided content from the distribution server 300. It is assumed that this data includes motion information and sound information associated with the stage character, as well as motion information and sound information associated with the sequential number character, which are used at least in generating a presentation image of the present frame. The data may additionally include, for example, information associated with staging to be presented, and information associated with control on the behaviors of mob characters.

In step S702, under control of the control unit 101, the decision unit 104 decides on viewpoint parameters associated with the provided content (the viewing position and the viewing direction). The decision unit 104 decides on the viewpoint parameters of the present frame by, for example, updating the viewpoint parameters that have been decided on with respect to a previous frame based on an operational input (e.g., an output from the orientation sensor 110) which is related to a change in the viewpoint and which has been detected between the previous frame and the present frame.

In step S703, the control unit 101 determines whether there has been an operational input that should be collected by the distribution server 300 as interaction information. When the control unit 101 has determined that the operational input that should be collected as interaction information has been performed, processing proceeds to step S704; when the control unit 101 has determined that such an operation input has not been performed, processing proceeds to step S705.

In step S704, the control unit 101 transmits information indicating the operational input that should be collected as the interaction information to the communication unit 108, causing the information to be transmitted to the distribution server 300.

In step S705, the control unit 101 determines whether the state of the sequential number character is the performer priority state or the interaction priority state. The determination of the present step may be made based on, for example, information of the state of the sequential number character received from the distribution server 300, or information of the progress of the provided content. When the control unit 101 has determined that the state of the sequential number character is the performer priority state, processing proceeds to step S706; when the control unit 101 has determined that the state of the sequential number character is the interaction priority state, processing proceeds to step S708.

In step S706, under control of the control unit 101, the behavior control unit 105 controls the behaviors of the stage character and the sequential number character based on the pieces of motion information obtained in step S701. More specifically, the behavior control unit 105 sets the state of the stage character (the state of each corresponding part in the three-dimensional model) associated with the present frame based on the motion information associated with the stage character obtained in step S701. Also, the behavior control unit 105 sets the state of the sequential number character associated with the present frame based on the motion information associated with the sequential number character obtained in step S701.

In step S707, under control of the control unit 101, the presentation control unit 106 performs sound composition processing associated with sound staging to be presented. The sound composition processing is processing for configuring pieces of sound information (presented sound information) that are to be output respectively in relation to the channels of the left-ear side and the right-ear side ultimately, and the presented sound information is configured by compositing the pieces of sound information while adjusting the sound volumes thereof based on, for example, the pieces of sound information to be presented and information indicating whether sound localization is enabled with respect to each piece of sound information. In the step, as sound localization is not enabled with respect to the stage character, the sound information associated with the stage character obtained in step S701 is adjusted so that the volume thereof is the same for both of the channels of the left-ear side and the right-ear side. On the other hand, sound localization is enabled with respect to the sequential number character; thus, regarding the sound information associated with the sequential number character obtained in step S701, the volume of each channel is adjusted based on the position of the sequential number character and the viewpoint parameters that have been decided on in step S702.

On the other hand, when it has been determined that the sequential number character is in the interaction priority state in step S705, the control unit 101 determines whether an operational input associated with an interaction with the sequential number character has been performed in step S708. Here, the operational input associated with the interaction with the sequential number character may include an operational input involving a talk to the sequential number character, an operational input involving a gaze on the sequential number character, and an operational input that is determined to have involved contact with the sequential number character, as stated earlier. When the control unit 101 has determined that the operational input associated with the interaction with the sequential number character has been performed, processing proceeds to step S709; when the control unit 101 has determined that such an operational input has not been performed, processing proceeds to step S706.

In step S709, under control of the control unit 101, the behavior control unit 105 controls the behaviors of the stage character and the sequential number character based on information of the operational input associated with the interaction with the sequential number character and the pieces of motion information obtained in step S701. More specifically, the behavior control unit 105 sets the state of the stage character associated with the present frame based on the motion information associated with the stage character obtained in step S701. The behavior control unit 105 also sets the state of the sequential number character associated with the present frame based on motion information which indicates the behaviors of the sequential number character and which has been set in advance with respect to the corresponding interaction.

In step S710, under control of the control unit 101, presentation control unit 106 performs sound composition processing associated with sound staging to be presented. In the sound composition processing performed in the present step, sound information that has been set in advance with respect to the corresponding interaction is used for the sequential number character, unlike the processing of step S707. Therefore, the presentation control unit 106 configures presented sound information by compositing the sound information that has been set with respect to the corresponding interaction and the sound information associated with the stage character after adjusting the sound volumes of respective channels based on the position of the sequential number character and the viewpoint parameters that have been decided on in step S702.

Note that regarding the presentation processing of the present embodiment, for the sake of easy understanding of the content of the processing, the description has been provided assuming that, in a case where the sequential number character is in the interaction priority state, the behavior control and the sound composition processing are performed based only on information that has been set in advance for an interaction with the sequential number character when an operational input associated with this interaction has been performed. However, as stated earlier, the present invention is not limited to being carried out in this way; in a case where the behavior control and the sound composition processing are performed with use of information that has been set in advance for an interaction with the sequential number character in preference to the real-time motion information and sound information associated with the sequential number character that have been obtained from the distribution server 300 when an operational input associated with this interaction has been performed, all of these pieces of information may be used.

In step S711, under control of the control unit 101, the presentation control unit 106 arranges the stage character and the sequential number character in the three-dimensional space in the states set by the behavior control unit 105, and renders this three-dimensional space based on the viewpoint parameters that have been decided on in step S702, thereby generating a presentation image associated with the provided content.

In step S712, under control of the control unit 101, the presentation control unit 106 causes the display unit 120 to display the presentation image, causes the sound output unit 130 to output the presented sound information, and completes the presentation processing associated with the present frame.

In this way, the viewing system of the present embodiment makes it possible to arrange an interactive object (sequential number character) that is different from a character that makes a stage performance in the three-dimensional space, and to provide an experience of viewing a live performance together; therefore, a viewing experience with significant realistic sensations can be realized.

Also, in the configuration of the present embodiment which arranges the sequential number character on the same side as the viewpoint of a viewing user, and which can provide mutual actions of the sequential number character and the stage character (the configuration in which direct sound communication is possible with respect to the sequential number character and the stage character), such mutual actions can be observed by a viewing user, which makes it possible to provide a viewing experience in which direct communication appears to be established between the stage character and the spectator side. In other words, in a situation where the sequential number character is present adjacent to a viewing user and viewing the same stage performance, and the viewing user and the sequential number character can make an interaction with each other, it is easy to project a viewing experience of the sequential number character, which can make direct communication with the stage character, as a viewing experience of the viewing user; as a result, it is possible to provide a viewing experience that offers greater realistic sensations than a conventional viewing experience in which only the stage character is viewed.

[Modification]

Although the embodiment has been described above assuming that a sequential number character is located at a position adjacent to the viewpoint associated with a viewing user in a three-dimensional space, the present invention is not limited to being carried out in this way. That is to say, the present invention is applicable to a mode in which a performer character that is controlled in terms of behaviors based on the physical motions of a performer and an operational input performed by a viewing user is located in a region in which the viewpoint associated with the viewing user is located (the floor side).

The invention is not limited to the foregoing embodiments, and various variations/changes are possible within the spirit of the invention.

What is claimed is:

1. A viewing system that provides a viewing user with an experience of viewing a content that presents a performer character whose behaviors are controlled based on physical motions of a performer, the content being a binocular stereopsis content that presents staging in a three-dimensional space in which a first performer character associated with a first performer and a second performer character associated with a second performer are arranged, the viewing system comprising:
- a first obtainment unit configured to obtained first motion information indicating physical motions of the first performer;
- a first behavior control unit configured to control behaviors of the first performer character;
- a second obtainment unit configured to obtain second motion information indicating physical motions of the second performer;
- a second behavior control unit configured to control behaviors of the second performer character;
- a third obtainment unit configured to obtain information of an operational input performed by the viewing user;
- a decision unit configured to, with respect to the content, decide on a viewpoint associated with the viewing user in the three-dimensional space;
- a rendering unit configured to render a presentation image associated with the content based on information of the viewpoint that has been decided on by the decision unit; and
- a presentation unit configured to present the presentation image rendered by the rendering unit, wherein
the first performer character is arranged in a first region in the three-dimensional space,
the viewpoint associated with the viewing user and the second performer character are arranged in a second region in the three-dimensional space, the second region being different from the first region,
the first behavior control unit controls behaviors of the first performer character based on the first motion information obtained by the first obtainment unit, and
the second behavior control unit controls behaviors of the second performer character based on at least one of the second motion information obtained by the second obtainment unit and the information of the operational input obtained by the third obtainment unit.

2. The viewing system according to claim 1, wherein
the first behavior control unit controls behaviors of the first performer character irrespective of the information of the operational input obtained by the third obtainment unit.

3. The viewing system according to claim 1, wherein
the viewpoint associated with the viewing user and the second performer character are arranged at positions that are not distanced from each other by more than a predetermined distance in the three-dimensional space.

4. The viewing system according to claim 1, wherein
in the viewing system, the content can be viewed simultaneously by a plurality of the viewing users who use different viewing apparatuses from one another,
the third obtainment unit obtains the information of the operational input that has been performed on each of the viewing apparatuses by the viewing user corresponding thereto, and
behaviors of the second performer character based on the information of the operational input are based on the information of the operational input obtained in one viewing apparatus, but include behaviors that are not based on the information of the operational input obtained in another viewing apparatus different from the one viewing apparatus.

5. The viewing system according to claim 1, wherein
a state of the second performer character includes at least a first state and a second state, and the second behavior control unit
controls behaviors of the second performer character based solely on the second motion information when the state of the second performer character is the first state, and
controls behaviors of the second performer character based on the second motion information or the information of the operational input when the state of the second performer character is the second state.

6. The viewing system according to claim 5, further comprising
a changing unit configured to change the state of the second performer character in accordance with a progress of the content.

7. The viewing system according to claim 1, wherein
the information of the operational input which has been performed by the viewing user and which is obtained by the third obtainment unit, includes information of an operational input related to a change in a viewing direction, and
whereas behaviors of the second performer character are controlled based on the information of the operational input related to the change in the viewing direction, behaviors of the first performer character are not controlled based on the information of the operational input related to the change in the viewing direction.

8. The viewing system according to claim 1, wherein
an object associated with the viewing user is further arranged in the three-dimensional space,
the information of the operational input which has been performed by the viewing user and which is obtained by the third obtainment unit, includes information of an operational input related to a movement of the object,
the viewing system further comprises:
- a determination unit configured to make a determination about contact with the object; and
- a unit configured to predetermine staging when the determination unit has determined that contact has been made by the object, and the determination unit makes a determination about contact between the object and the second performer character, but does not make a determination about contact between the object and the first performer character.

9. The viewing system according to claim 1, wherein
the staging presented by the content includes sound staging for outputting sounds that have been input in association with the first performer character and the second performer character, and
whereas sound staging associated with the second performer character is presented in a mode that enables sound localization, sound staging associated with the first performer character is presented in a mode that does not enable sound localization.

10. The viewing system according to claim 1, wherein
the second performer character is arranged in the second region as a character that views a performance of the first performer character with the viewing user.

11. A distribution apparatus that distributes the content in the viewing system according to claim 1, the distribution apparatus comprising:
the first obtainment unit;
the second obtainment unit; and
a transmission unit configured to transmit the first motion information obtained by the first obtainment unit, as well as the second motion information obtained by the second obtainment unit, to a viewing apparatus used by the viewing user.

12. A viewing apparatus that presents the content to the viewing user in the viewing system according to claim 1, the viewing apparatus comprising:
   a reception unit configured to receive the first motion information obtained by the first obtainment unit, as well as the second motion information obtained by the second obtainment unit;
   the first behavior control unit;
   the second behavior control unit;
   the third obtainment unit;
   the decision unit;
   the rendering unit; and
   the presentation unit.

13. A non-transitory computer-readable recording medium that includes a program recorded thereon, the program being for causing a computer to function as each unit of the viewing apparatus according to claim 12.

\* \* \* \* \*